United States Patent
Chen et al.

(10) Patent No.: US 12,473,429 B2
(45) Date of Patent: *Nov. 18, 2025

(54) EPOXY BASED MOISTURE VAPOR BARRIER AND PRIMER

(71) Applicant: LATICRETE INTERNATIONAL, INC., Bethany, CT (US)

(72) Inventors: Yunbo Chen, Woodbridge, CT (US); Randall Bright, Naugatuck, CT (US)

(73) Assignee: Laticrete International, Inc., Bethany, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/204,019

(22) Filed: May 31, 2023

(65) Prior Publication Data

US 2023/0303823 A1  Sep. 28, 2023

Related U.S. Application Data

(63) Continuation of application No. 16/537,796, filed on Aug. 12, 2019, now Pat. No. 11,685,828.

(51) Int. Cl.
| | | |
|---|---|---|
| *C08L 63/00* | (2006.01) | |
| *C08G 59/50* | (2006.01) | |
| *C08K 3/013* | (2018.01) | |
| *C08K 5/00* | (2006.01) | |
| *C08K 5/17* | (2006.01) | |
| *C09D 163/00* | (2006.01) | |

(52) U.S. Cl.
CPC .............. *C08L 63/00* (2013.01); *C08G 59/50* (2013.01); *C09D 163/00* (2013.01); *C08K 3/013* (2018.01); *C08K 5/0025* (2013.01); *C08K 5/17* (2013.01); *C08L 2201/14* (2013.01)

(58) Field of Classification Search
CPC ...... C09D 163/00–10; C08L 63/00–10; C08G 59/50
See application file for complete search history.

(56) References Cited

U.S. PATENT DOCUMENTS

| | | | |
|---|---|---|---|
| 3,850,661 A | 11/1974 | Dreher et al. | |
| 5,229,438 A * | 7/1993 | Ishida | C08G 59/226 |
| | | | 523/428 |
| 5,322,864 A * | 6/1994 | Sugimoto | C08K 3/08 |
| | | | 428/404 |
| 5,536,775 A | 7/1996 | Curatolo et al. | |
| 7,230,051 B2 * | 6/2007 | Gobelt | C08F 293/005 |
| | | | 525/934 |
| 2004/0057793 A1 * | 3/2004 | Gurzo | E01C 23/14 |
| | | | 404/79 |
| 2008/0118659 A1 | 5/2008 | DeAntoni et al. | |
| 2009/0308642 A1 | 12/2009 | Murata et al. | |
| 2010/0040791 A1 | 2/2010 | Funston | |
| 2010/0160494 A1 | 6/2010 | Yonchama et al. | |
| 2016/0040031 A1 * | 2/2016 | Kubota | G02B 5/003 |
| | | | 252/582 |

FOREIGN PATENT DOCUMENTS

| | | | |
|---|---|---|---|
| JP | 2018080229 A | * | 5/2018 |
| KR | 100563401 B1 | | 3/2006 |

OTHER PUBLICATIONS

Akzonobel, Safety Data Sheet, Hardener 92179 for Aerodur HS 37092 (Year: 2012).*
Partial machine translation of KR 100563402 B1.*
BYK, BYK-054—Material Data Sheet—Jan. 7, 2011.

* cited by examiner

*Primary Examiner* — Kregg T Brooks
(74) *Attorney, Agent, or Firm* — DeLio Peterson & Curcio LLC; Kelly M. Nowak (57) ABSTRACT

Two-component epoxy-based liquid formulations and their resultant dual use epoxy-based products. The epoxy-based liquid formulations include a liquid epoxy resin composition mixed with a liquid epoxy curing agent composition. The liquid epoxy resin compositions include one or more liquid epoxy resins containing a reactive oxirane structure or epoxide group, while the liquid epoxy curing agent composition comprises one or more epoxy curing agents. The liquid epoxy resin and liquid epoxy curing agent compositions are mixed together to provide a dual functioning epoxy-based formulation that, when applied to a substrate and cured, provides a cured three-dimensional cross-linked thermoset dual acting epoxy-based product having both the moisture vapor barrier and the primer functionalities.

17 Claims, 1 Drawing Sheet

EPOXY BASED MOISTURE VAPOR BARRIER AND PRIMER

BACKGROUND OF THE INVENTION

1. Field of the Invention

The present invention is directed to an epoxy-based product, and in particular, to a dual use epoxy-based product that, when applied to a substrate, acts as both a moisture vapor barrier and a primer.

2. Description of Related Art

Water, moisture or moisture vapor are destructive elements when not properly controlled in the installation of flooring products on substrates that are susceptible to water seepage. Moisture permeating from the underlying substrate can also present a problem for moisture sensitive floor coverings. All structures that may come into contact with water must typically be protected from water seepage. In doing so, a waterproofing membrane is used to prevent the water, moisture or moisture vapor seeping out of the underlying substrate from contacting the overlying layers, such as, mortar, grout, tiles, etc.

In flooring installation, a waterproofing membrane is typically used over concrete, masonry, terrazzo, cement backer boards, gypsum boards (interior wall use only) and exterior grade plywood. In all waterproofing approaches, the moisture permeation of waterproofing membranes, layers or barriers must be mitigated to an acceptable level for the floor coverings to function satisfactorily.

Conventionally, the underlying substrate is overlaid with a fluid applied waterproofing membrane, covered with a reinforcing fabric and then overlaid with another layer of the fluid waterproofing membrane. Other methods employ a waterproofing membrane sheet. A mortar is then applied over the waterproofing membrane surface and provides the base for installing ceramic tile. A grout is then used between the openings in the ceramic tile.

Another popular approach is to use formulated compositions that provide a waterproofing layer or barrier, in combination with a self-leveling underlayment. Known waterproofing barrier approaches utilize formulated compositions of two-component resin-based products that each form a membrane to mitigate the moisture issue, as specified in ASTM F3010. However, when known two-component resin-based products are used on concrete substrates, and a cementitious product such as cement based self-leveling underlayment is to be installed on the moisture mitigation barrier or layer, a primer, such as emulsion-based primer, is recommended to enhance adhesion and bonding between the self-leveling underlayment to the moisture mitigation barrier or layer.

Typically, high-solids epoxy primers or acrylic primers in combination with broadcast sand are employed to provide a suitable bonding surface for the overlying layer. In this process the primer is prepared and then rolling onto the flooring surface. While the primer is wet, a bed of sand is broadcast onto and into the primer layer so that the broadcast sand fully covers the primer layer. This bed of broadcast sand is required for the bonding and adhesion of the overlying layer to the primer layer. Once the wet primer layer is fully broadcast and covered with sand, the primer layer and sand overcoat must be cured until set or dry. In addition to this time, the subsequent curing process is time consuming, often taking between 12-24 hours or more, until the primer layer and sand are fully cured.

After the primer layer and sand overcoat are fully cured, excess sand must then be removed from the cured surface. This step is very time consuming and labor intensive taking a day or more to complete since excess sand must be removed by surface scraping and then vacuuming. It is also often necessary to repeat this sand removal step several times until it is determined that the sand has been sufficiently removed. Another drawback of this step is that it releases particulate matter into the air, which may be hazardous to the worker's health (i.e., installer). For instance, health hazardous silica particles may become airborne and detrimentally inhaled by such workers, which are currently regulated and controlled by OSHA Regulations.

The use of self-leveling underlayments and polishable overlays have increased in popularity. Known methods and systems for applying layers over a primer/broadcast sand layer are less than ideal since they generate industry wide problems for manufacturers, installers (i.e., workers), and the end users. Also, in applying the layers (e.g., self-leveling underlayments, polishable overlays, etc.) over the epoxy primer/sand broadcast layer, if all loose sand is not removed from the flooring surface prior to application of the overlying layer, then unwanted debonding occurs between the primer/sand broadcast layer and such overlying layer. There is also loss of bonding due to the curling nature during the curing process of cement-based products. The side effects that occur from this delamination include a hollow sounding floor and cracking, both of which are less than ideal in the final end product.

There continues to be a need for new and improved epoxy-based products improved methods, and systems for easily, time efficiently, and safely applying layers over a flooring or substrate surface, for which the present invention provides a solution thereto.

SUMMARY OF THE INVENTION

Bearing in mind the problems and deficiencies of the prior art, it is therefore an object of the present invention to provide a dual use epoxy-based product that, when applied to a substrate, acts as both a moisture vapor barrier and a primer.

Another object of the present invention is to provide an epoxy-based product that eliminates the additional primer step.

It is another object of the present invention to provide methods of applying layers over a dual use epoxy-based product without the need for a primer layer.

A further object of the invention is to provide systems of applying layers over a dual use epoxy-based product without the need for a primer layer.

It is another object of the present invention to provide a method for making an improved waterproofing membrane composition and a method for using the waterproofing membrane composition of the invention.

It is yet another object of the present invention to provide dual use epoxy-based products having reduced hazardous health risks during application thereof.

Another object of the present invention is to provide dual use epoxy-based products that are cost efficient and provide strong, durable dried products.

A further object of the invention is to provide methods and systems for easily, time efficiently, and safely applying layers (e.g., self-leveling underlayments, polishable overlays, etc.) over a flooring or substrate surface that eliminate the additional primer steps.

Still other objects and advantages of the invention will in part be obvious and will in part be apparent from the specification.

The above and other objects, which will be apparent to those skilled in the art, are achieved in the present invention which is directed to a two-component epoxy-based liquid formulation comprising a liquid epoxy resin composition and a liquid epoxy curing agent composition. The liquid epoxy resin composition comprises one or more liquid epoxy resins containing a reactive oxirane structure or epoxide group, while the liquid epoxy curing agent composition comprises one or more epoxy curing agents. The liquid epoxy resin composition and the liquid epoxy curing agent composition are mixed together to provide a dual functioning epoxy-based formulation that, when applied to a substrate and cured, simultaneously acts as both a moisture vapor barrier and a primer.

In one or more embodiments the reactive oxirane structure or epoxide group has a structure comprising The one or more liquid epoxy resins may include one or more bisphenol based liquid epoxy resins, such as, a bisphenol-A liquid epoxy resin, a diglycidyl ether of bisphenol A, a bisphenol F, a liquid bisphenol-A/F resin blend, or an aliphatic glycidyl ether reactive diluent, modified liquid epoxy resin.

The one or more liquid epoxy resins may be one or more C12-C14 aliphatic chain glycidyl ether reactive diluent, modified bisphenol-A/F based liquid epoxy resins. In particular, the one or more liquid epoxy resins may be one or more C12-C14 aliphatic chain glycidyl ether reactive diluents having the reactive oxirane structure or epoxide group comprising diglycidyl ether of bisphenol A, or bisphenol F, or a liquid bisphenol-A/F resin blend.

The liquid epoxy resin composition may further include a reactive or a non-reactive diluent comprising a bisphenol based liquid epoxy resin. For instance, the bisphenol based liquid epoxy resin may include a diglycidyl ether of bisphenol-A, a bisphenol-A liquid epoxy resin, a bisphenol-F based liquid epoxy resin, a liquid bisphenol-A/F resin blend, an aliphatic glycidyl ether reactive diluent modified liquid epoxy resin, or an aliphatic glycidyl ether reactive diluent, modified liquid epoxy resin.

The liquid epoxy resin composition may further include an epoxy functional reactive diluent selected from the group consisting of an aromatic glycidyl ether, aliphatic glycidyl ether, glycidyl amine, or glycidyl ether. The epoxy functional reactive diluent may be a diglycidyl ether comprising 1,4 butanediol diglycidyl ether aliphatic difunctional modifier that is an epoxy reactive diluent. The liquid epoxy resin composition may also include adhesion promoters, defoamers, wetting and dispersing additives, pigments and/or fillers.

In one or more embodiments the liquid epoxy resin composition may include one or more liquid epoxy resins comprising one or more bisphenol based liquid epoxy resins (in an amount ranging from 80-100 wt. %), an epoxy functional reactive diluent comprising a diglycidyl ether (in an amount ranging from 0-20 wt. %), an adhesion promoter comprising a γ-Glycidoxypropyl-trimethoxy silane coupling agent (in an amount ranging from 0-3 wt. %), a defoamer comprising a naphtha (petroleum) heavy alkylate defoamer (in an amount ranging from 0-1 wt. %), a wetting and dispersing additive comprising a silicone acrylate copolymer (in an amount ranging from 0-1 wt. %), pigment (in an amount ranging from 0-2 wt. %), and one or more fillers (in an amount ranging from 0-20 wt. %). The weight percentages are based on a total weight of the liquid epoxy resin composition.

In the present two-component epoxy-based liquid formulations, the one or more epoxy curing agents of the liquid epoxy curing agent composition may include liquid polyamines, polyamine adduct curing agents, and/or aliphatic amines. The liquid epoxy curing agent composition may be a mixture of a first epoxy curing agent being a solvent-free modified aliphatic amine and a second epoxy curing agent being a modified polyamine curing agent.

In one or more embodiments the liquid epoxy curing agent composition may include the one or more epoxy curing agents comprising one or more liquid polyamine (R—NH$_2$) epoxy curing agents (in an amount ranging from 80-100 wt. %); a catalytic curing agent comprising tertiary amines (in an amount ranging from 0-5 wt. %); an adhesion promoter comprising diaminofunctional silanes (in an amount ranging from 0-3 wt. %); a defoamer (in an amount ranging from 0-1 wt. %); a wetting and dispersing additive (in an amount ranging from 0-1 wt. %); pigment (in an amount ranging from 0-2 wt. %); and one or more fillers (in an amount ranging from 0-20 wt. %).

In other embodiments the liquid epoxy resin composition may include the one or more liquid epoxy resins being one liquid epoxy resin comprising a mixture of: xirane, 2,2'-[(1-methylethylidene)bis(4,1-phenyleneoxymethylene)]bis-, homopolymer; a formaldehyde polymer having (chloromethyl)oxirane and phenol; and an alkyl (C12-14) glycidyl ether; a reactive diluent being a bisphenol based liquid epoxy resin comprising oxirane, 2,2'-[1,4-butanediylbis(oxymethylene)]bis; and a defoamer comprising naphtha (petroleum) heavy alkylate. In these embodiments, the one or more liquid epoxy resins may further include a first epoxy curing agent comprising a mixture of: 4-tert-butylphenol; 2,4,6-Tri(dimethylaminomethyl)phenol; and methyl alcohol, mixed with a second epoxy curing agent comprising a mixture of: phenol 4-nonyl-branched; 1,3-benzenedimethanamine; benzyl alcohol; and phenol, in combination with an adhesion promoter comprising a diaminofunctional silane.

In embodiments of the invention, the liquid epoxy resin composition and the liquid epoxy curing agent composition may be mixed together in a stoichiometric ratio ranging from 1.5:1.0 to 3.4:1.0 to provide the dual functioning epoxy-based formulation. When the dual functioning epoxy-based formulation is applied to the substrate, the liquid epoxy resin composition and the liquid epoxy curing agent composition react with each other to provide a cured three-dimensional cross-linked thermoset dual acting epoxy-based product having both the moisture vapor barrier and the primer functionalities.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
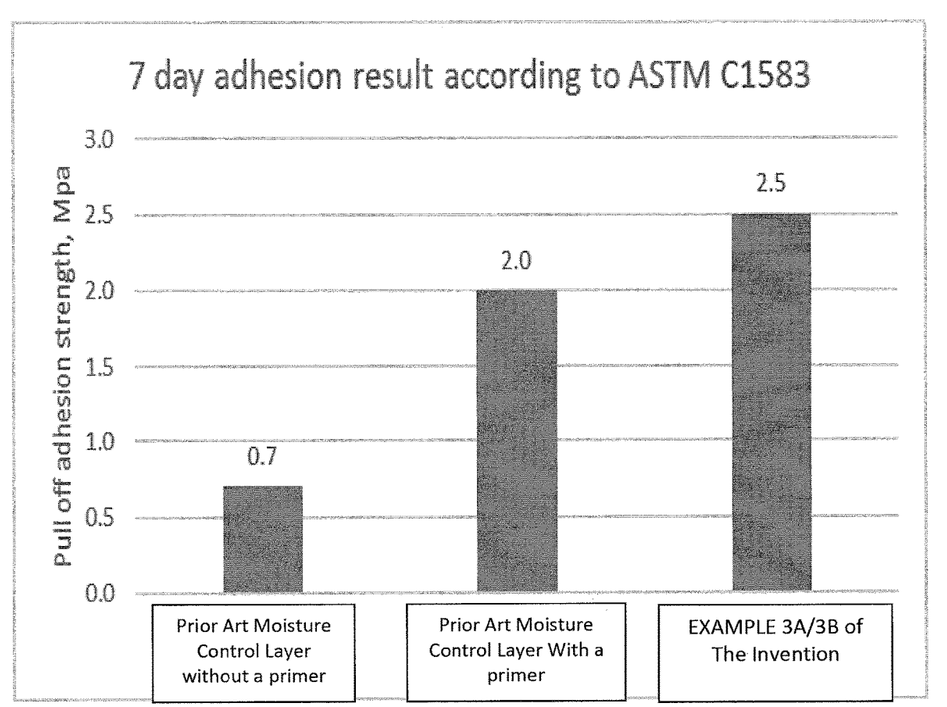
FIG. 1 is a comparative graph showing the beneficial results of the invention, whereby adhesion strengths of prior art products are compared to a dual acting epoxy-based formulation in accordance with the invention.

In describing the preferred embodiment of the present invention, reference will be made herein to FIG. 1 of the drawings in which like numerals refer to like features of the invention.

The various embodiments of the invention are directed to dual acting epoxy-based formulations, and their resultant products, that act as both a moisture vapor barrier and a primer, simultaneously. Working as a moisture vapor barrier, the present cured layers of the invention meet the ASTM F3010 Standard Practice for two-component resin-based membrane-forming moisture mitigation systems for use under resilient floor coverings. Simultaneously, working as a primer the present cured layers of the invention promote direct adhesion and bonding between the substrate (e.g., flooring) and the subsequently deposited cementitious products (e.g., mortars, self-leveling underlayments, polishable overlays, etc.). The term "mortar" will be used herein to refer to thin-set mortars, medium bed mortars, underlayment or leveling mortars and grouts and pointing mortars.

The embodiments of the present invention can comprise, consist of, and consist essentially of the features and/or steps described herein, as well as any of the additional or optional ingredients, components, steps, or limitations described herein or would otherwise be appreciated by one of skill in the art. It is to be understood that all concentrations disclosed herein are by weight percent (wt. %.) based on a total weight of the composition, or each particular composition, unless otherwise indicated.

In accordance with the various embodiments of the invention, the invention avoids, or makes it not necessary, to apply a primer layer (e.g., an epoxy primer layer) and/or a broadcast sand layer over the primer layer (e.g., primer/sand broadcast layer). As such, the invention avoids the need to wait for such primer/sand broadcast layers to cure, and the need for removal of any residual sand from the surface thereof. The invention avoids the time it takes to apply a primer layer, broadcasting of sand into and onto such primer layer, cure time, and subsequent excess sand removal time are avoided. Also avoided is the detrimental health side-affects caused by these steps, as well as the debonding or delamination between a primer/sand broadcast layer and a subsequently deposited layer.

In accordance with the invention, one or more embodiments are directed to dual acting epoxy-based formulations that are each suitable and act as both a moisture vapor barrier and a primer when applied over a substrate susceptible to water, moisture, moisture vapor seepage. For ease of understanding the invention, reference is made herein to moisture, however, it should be understood that the term 'moisture' refers to water, moisture, moisture vapor, liquid, or any other material that is able to wet and damage a substrate (e.g., flooring).

The various moisture vapor barrier and primer epoxy-based formulations are formulated initially as a two-component liquid system that is mixed together prior to use to form the instant epoxy-based formulations. The two-component liquid system includes a liquid epoxy resin composition (Part A) and a liquid epoxy curing agent composition (Part B).

Part A: The liquid epoxy resin composition (Part A) preferably includes any liquid epoxy resins that contain(s) or include(s) the reactive oxirane structure or epoxide group as follows:

For instance, in one or more embodiments the preferred liquid epoxy resin may be diglycidyl ether of bisphenol A, or bisphenol F, or a mixture of bisphenol A and bisphenol F. In these embodiments a reactive or a non-reactive diluent may be added to the liquid epoxy resin composition (Part A) to reduce overall viscosity of the composition. Suitable liquid epoxy resin components of the invention may include, but are not limited to, bisphenol based liquid epoxy resins. The bisphenol based liquid epoxy resins suitable for use in the present invention include, but are not limited to, a diglycidyl ether of bisphenol-A; a low viscosity, undiluted, bisphenol-A liquid epoxy resin; a low viscosity, undiluted, bisphenol-A liquid epoxy resin; a standard, bisphenol-F based liquid epoxy resin; a low viscosity, liquid bisphenol-A/F resin blend; a low viscosity, liquid bisphenol-A/F resin blend; and/or an aliphatic glycidyl ether reactive diluent, modified liquid epoxy resin.

In one or more preferred embodiments, the liquid epoxy resin component of the liquid epoxy resin composition (Part A) may include a bisphenol based liquid epoxy resin that is a C12-C14 aliphatic chain glycidyl ether reactive diluent, modified bisphenol-A/F based liquid epoxy resin. For instance, the liquid epoxy resin component within the liquid epoxy resin composition (Part A) of the invention may be a C12-C14 aliphatic chain glycidyl ether reactive diluent having a reactive oxirane structure or epoxide group, diglycidyl ether of bisphenol A, or bisphenol F, or a mixture thereof.

The reactive diluent within the liquid epoxy resin component lowers both the viscosity and the surface tension in the liquid epoxy resin composition to provide improved surface wetting (ease of contacting and spreading over a given substrate) and adhesion to both the liquid epoxy resin composition (Part A) and the resultant dual acting epoxy-based formulations of the invention. The reactive diluent also increases pot life and flexibility (impact resistance) to the (Part A) composition and the overall resultant epoxy-based formulations of the invention.

In a preferred embodiment, the liquid epoxy resin component may include in combination: xirane, 2,2'-[(1-methylethylidene)bis(4,1-phenyleneoxymethylene)]bis-, homopolymer (present in the epoxy resin component in amount from about 61-71 wt. %); a formaldehyde, polymer with (chloromethyl)oxirane and phenol (present in the epoxy resin component from about 14-24 wt. %); and alkyl (C12-14) glycidyl ether (present in the epoxy resin component from about 9-19 wt. %), whereby all weight percentages are based on a total weight of the epoxy resin component. This liquid epoxy resin component may be present within the liquid epoxy resin composition (Part A) of the invention in an amount from about 84-100 wt. %, based on a total weight percentage of Part A.

The liquid epoxy resin composition (Part A) of the invention also includes a diluent. The diluent may include any reactive diluent that is a monomer and modifier used in epoxy formulations to reduce viscosity and improve handling, processing, and application properties of formulations. The chemistries of suitable epoxy reactive diluents for use in the invention include, but are not limited to, aromatic glycidyl ethers, aliphatic glycidyl ethers, glycidyl amines, glycidyl esters, and various other mono-epoxy functional to multi-epoxy functional constituents. In one or more preferred embodiments, suitable reactive diluent components for use in the invention may include, but are not limited to, aliphatic diglycidyl ethers that act as epoxy functional monomers and modifiers. For instance, the reactive diluent may include a low viscosity, aliphatic diglycidyl ether comprising 1,4 butanediol diglycidyl ether aliphatic difunctional modifier that is an epoxy reactive diluent, and in particular those suitable for use as a reactive diluent for high viscosity epoxy resins.

In the preferred embodiment, the reactive diluent component of Part A may include oxirane, 2,2'-[1,4-butanediylbis(oxymethylene)]bis-, present in the liquid epoxy resin composition (Part A) of the invention in an amount from about 4.8-5.0 wt. %.

Also included in the liquid epoxy resin composition (Part A) of the invention is an adhesion promoter constituent. The adhesion promoter may include any composition or material that is known to promote adhesion in epoxy resin compositions. In one or more embodiments the adhesion promoter may be an epoxy functional silane-based cross-linking, coupling, or curing agent. The epoxy functional silane coupling agents are reactive with epoxy to enhance adhesion and increase strength of the epoxy resin compositions. For instance, a suitable silane-based adhesion promoter may include a γ-Glycidoxypropyl-trimethoxy silane coupling agent that has both organic and inorganic reactivity, and imparts superior adhesion and strength properties to the liquid epoxy resin composition (Part A) of the invention.

A defoamer and/or wetting and dispersing additives may also be included within the instant liquid epoxy resin compositions (Part A). The defoamer may include those defoamers capable of destroying polymers and polysiloxane foams. In one or more embodiments the defoamer may be based on silicones and polymers for solvent-free and solvent-borne adhesives and sealants. A suitable defoamer for use in the present invention may be a defoamer based on silicones and polymers, such as, naphtha (petroleum) heavy alkylate defoamers. The wetting and dispersing additives provide the instant liquid epoxy resin compositions (Part A) with a strong reduction in the surface tension of the wet coating. In one or more embodiments the wetting and dispersing additives may be a surface-active additive based on a silicone acrylate copolymer, such as, 2-methoxypropyl-1-acetate which is a solution of a silicone-modified polyacrylate. Both the defoamers and wetting/dispersing additives may be added to the instant liquid epoxy resin composition (Part A) to provide the resultant dual acting epoxy-based formulations and cured films of the invention with increased film quality and performance.

In the preferred embodiment, the defoamer component of Part A may include naphtha (petroleum) heavy alkylate, present in the liquid epoxy resin composition (Part A) of the invention in an amount from about 0.192-0.194 wt. %. The wetting/dispersing agent may be 2-methoxypropyl-1-acetate present in the Part A component in an amount <=0.001 wt. %.

The liquid epoxy resin compositions (Part A) of the invention may further include one or more additional constituents, either singly or in various combinations with one another, to provide the liquid epoxy resin compositions (Part A) with desired properties, characteristic and/or attributes. These one or more additional constituents include, but are not limited to, pigment(s) to provide different colors to the resultant cured film of the invention, and filler(s) such as quartz sand and mica which may be beneficial in reducing costs and/or helping mitigate moisture vapor transmission.

In accordance with one or more embodiments of the invention, various formulations of the present liquid epoxy resin compositions (Part A) of the invention are described below in Table 1:

TABLE 1

| Liquid Epoxy Resin Composition (Part A) | | | |
|---|---|---|---|
| Composition/ Property | Range (wt. %)* | Preferred Range (wt. %)* | Most Preferred Range (wt. %)* |
| Liquid epoxy resin | 40-100 wt. % | 80-100 wt. % | >90-100 wt. % |
| Epoxy functional reactive diluent | 0-50 wt. % | 0-20 wt. % | 0-10 wt. % |
| Adhesion promoter | 0-10 wt. % | 0-3 wt. % | 0-1 wt. % |
| Defoamer | 0-5 wt. % | 0-1 wt. % | 0-0.5 wt. % |
| Wetting and dispersing additive | 0-5 wt. % | 0-1 wt. % | 0-0.5 wt. % |
| Pigment | 0-6 wt. % | 0-2 wt. % | 0-2 wt. % |
| Filler | 0-60 wt. % | 0-20 wt. % | 0-10 wt. % |
| TOTAL FORMULATION | 100 wt. % | 100 wt. % | 100 wt. % |

*Range weight % based on total weight of resultant liquid epoxy resin composition (Part A)

Part B: The second component of the present two-component liquid system comprises the liquid epoxy curing agent composition (Part B). The liquid epoxy curing agent composition (Part B) may include one or more epoxy curing agent(s) having molecules containing a reactive hydrogen(s) that will react with the epoxide groups of the liquid epoxy resin composition (Part A). These epoxy curing agents may include, but are not limited to, polyamines, polyamine adduct curing agents and aliphatic amines. In one or more embodiments, the preferred liquid epoxy curing agents include liquid polyamines (R—NH$_2$), or their modifications, or their adducts, which are capable of reacting with the liquid epoxy resin component residing within the liquid epoxy resin composition (Part A) at ambient temperature.

While not meant to limit the invention, in one or more embodiments it has been found that two or more epoxy curing agents in combination are suitable for use as the liquid epoxy curing agent composition (Part B) of the invention. The combination of the first and second epoxy curing agents provide the resultant dual acting epoxy-based formulations of the invention with dual functionalities of acting as both a moisture vapor barrier and a primer, thereby avoiding the need to subsequently applying a primer layer.

The first epoxy curing agent may be a solvent free modified aliphatic amine suitable for use at ambient and low temperatures. The first epoxy curing agent may provide a fast cure rate, low temperature curing, is moisture tolerant, offers chemical resistant, and has low VOC and emissions, all while providing flooring systems with moisture vapor barrier protection. The second epoxy curing agent may be a modified polyamine curing agent having properties including, but not limited to, a fast cure rate, low temperature curing, high hardness, high tensile strength, and high tear strength.

In the preferred embodiment, the first epoxy curing agent of the liquid epoxy curing agent composition (Part B) may include in combination: 4-tert-butylphenol (present in Part B in amount from about 4-12 wt. %); 2,4,6-Tri(dimethylaminomethyl)phenol (present in Part B in amount from about 0.6-3.0 wt. %); and methyl alcohol (present in Part B in an amount <0.01 wt. %), whereby all weight percentages are based on a total weight of the liquid epoxy curing agent composition (Part B). The second epoxy curing agent of the liquid epoxy curing agent composition (Part B) may include in combination: Phenol, 4-nonyl-, branched (present in Part B in amount from about 9-24 wt. %); 1,3-benzenedimethanamine (present in Part B in amount from about 9-22 wt. %); benzyl alcohol (present in Part B in amount from about 5-10 wt. %); and phenol (present in Part B in amount from about 3-6 wt. %), whereby all weight percentages are based on a total weight of Part B. The first and second epoxy curing agents are combined to provide the instant liquid epoxy curing agent composition (Part B).

The liquid epoxy curing agent composition (Part B) may also include a number of different additives including, but not limited to, catalytic curing agent(s), adhesion promoter(s), defoamer(s), wetting and dispersing additive(s), pigment(s) and filler(s). The catalytic curing agents, such as tertiary amines, may be added to facilitate the curing reaction with the liquid epoxy resin composition (Part A). A variety of known catalytic curing agents may be used in the present liquid epoxy curing agent composition (Part B) to achieve the desired performance.

In one or more embodiments adhesion promoter(s) are preferred in the liquid epoxy curing agent composition. These adhesion promoter(s) may include diaminofunctional silane(s) to improve the adhesion of amino-reactive resins to surfaces. For instance, in certain embodiments of the invention a preferred adhesion promoter is a hydrophobic diaminofunctional silane characterized by having randomly distributed linear and cyclic oligosiloxanes.

In accordance with one or more embodiments of the invention, various formulations of the present liquid epoxy curing agent composition (Part B) of the invention are described below in Table 2:

TABLE 2

Liquid Epoxy Curing Agent Composition (Part B)

| Composition/ Property | Range (wt. %)* | Preferred Range (wt. %)* | Most Preferred Range (wt. %)* |
|---|---|---|---|
| One or more liquid epoxy curing agent(s) | 50-100 wt. % (combined amount of one or more epoxy curing) | 80-100 wt. % (combined amount of one or more epoxy curing) | >90-100 wt. % |
| Catalytic curing agent | 0-20 wt. % | 0-5 wt. % | 0-3 wt. % |
| Adhesion promoter | 0-10 wt. % | 0-3 wt. % | 0-2 wt. % |
| Defoamer | 0-5 wt. % | 0-1 wt. % | 0-0.5 wt. % |
| Wetting and dispersing additive | 0-5 wt. % | 0-1 wt. % | 0-0.5 wt. % |
| Pigment | 0-6 wt. % | 0-2 wt. % | 0-2 wt. % |
| Filler | 0-60 wt. % | 0-20 wt. % | 0-10 wt. % |
| TOTAL FORMULATION | 100 wt. % | 100 wt. % | 100 wt. % |

*Range weight % based on total weight of liquid epoxy curing agent composition (Part B)

For the various liquid epoxy resin composition(s) (Part A) and liquid epoxy curing agent composition(s) (Part B) described above, each composition may be separately mixed by combining the constituents/ingredients thereof in any order. For instance, the ingredients of the liquid epoxy resin component or the curing agent component may be added in any sequence in a mixer that enables homogeneous mixing. Optionally, the pigment and/or filler(s) may be added or supplied as third component compositions. The completed Part A composition and Part B composition may be stored prior to use in formulation the resultant dual acting epoxy-based formulations of the invention.

Once the liquid epoxy resin composition (Part A) and liquid epoxy curing agent composition (Part B) are completed, these two-component liquid systems are then mixed together to form the resultant dual acting epoxy-based formulations of the invention. Preferably, the Part A and Part B compositions are mixed just prior to use of the formed dual acting epoxy-based formulation. In mixing these Part A and Part B compositions, the amounts or ratios of mixing Part A to Part B compositions is based on the stoichiometric ratio of the individual reactive ingredients within each composition, along with the percentages of such ingredients within the two compositions. In determining the stoichiometric ratio, it will be appreciated by one skilled in the art that each reactive material has different equivalent weight which is used to calculate the stoichiometric ratio.

In one or more embodiments of the invention the stoichiometric ratio of mixing Part A to Part B may range from about 1.5 (Part A):1.0 (Part B) to 3.4 (Part A):1.0 (Part B). In certain embodiments it has been found that the ratio of Part A to Part B compositions may be up to 30% off the stoichiometric ratio in order to obtain high adhesion with both underlying and overlying cementitious products. Any higher percentages off the stoichiometric ratio is undesirable as the resultant dual acting epoxy-based formulations of the invention will not meet the moisture vapor transmission rate criteria specified in the ASTM F3010 standard. As a result of mixing Part A to Part B in these stoichiometric ratios, the formed dual acting epoxy-based film/layer product of the invention has both vapor barrier and primer functionalities.

Upon mixing the desired ratio of liquid epoxy resin composition (Part A) to liquid epoxy curing agent composition (Part B), the resultant dual acting liquid epoxy-based formulation of the invention is formed. This formulation is applied over a surface, whereby the epoxy resin and curing agent react with each other to provide a cured, resultant three-dimensional cross-linked thermoset dual acting epoxy-based product of the invention. This cured dual acting epoxy-based product of the invention may be a layer or film having a three-dimensional structure that is dense enough to block the passage of moisture or moisture vapor to an extent that meets the stringent ASTM F3010 standard.

In addition, the final cured dual acting epoxy-based product is provided with adhesion promoters, either via the Part A composition, the Part B composition, or both, to increase adhesion of such final cured dual acting epoxy-based product with a subsequently deposited cementitious material (e.g., mortar, grout, etc.) without the need or use of a primer and the additional steps associated therewith. In accordance with one or more embodiments of the invention, silane adhesion promoters are added to either the liquid epoxy resin composition (Part A), the liquid epoxy curing agent composition (Part B), or both the Part A and Part B compositions to further increase the adhesion. In doing so, the subsequently deposited cementitious materials bond with the cured dual acting epoxy-based film/layer product of the invention (e.g., through hydrogen bonding) without the need for a primer layer. As such, the resultant cured dual acting epoxy-based film/layer product of the invention functions both as a moisture vapor barrier and a primer.

Thus, the present invention eliminates the additional need for a primer step, as discussed in detail above. The various embodiments of the invention advantageously overcome the above problems by providing methods, dual acting epoxy-based formulations and their cured dual acting epoxy-based products (e.g., films) that are applied faster, easier, more time efficiently, and safer than known approaches requiring use of primer layers and/or sand blasting. It has been found that the present dual acting epoxy-based films of the invention combine moisture mitigation and primer into a single product, while eliminating the priming step at a job site.

While not meant to be limiting, one or more examples of the invention are described in detail below.

Example 1A: Liquid Epoxy Resin Composition (Part A)

| Composition/Property | Weight %* |
|---|---|
| Liquid epoxy resins | 89.0 wt. % |
| Epoxy functional reactive diluent | 10.0 wt. % |
| Adhesion promoter | 0.44 wt. % |
| Defoamer | 0.44 wt. % |
| Wetting and dispersing additive | 0.2 wt. % |
| TOTAL FORMULATION | 100 wt. % |

*Range weight % based on total weight of resultant liquid epoxy resin composition (Part A)

Example 1B: Liquid Epoxy Curing Agent Composition (Part B)

| Composition/Property | Weight %* |
|---|---|
| Liquid epoxy curing agents | 99.0 wt. % |
| Adhesion promoter | 1.0 wt. % |
| TOTAL FORMULATION | 100 wt. % |

*Range weight % based on total weight of the liquid epoxy curing agent composition (Part B)

In Examples 1A and 1B, the Part A and Part B compositions are mixed at the stoichiometric ratio of 2.0 to 1. The formulated dual acting epoxy-based liquid was applied to a concrete substrate using known techniques to a thickness of about 16 mil. The deposited dual acting epoxy-based liquid was allowed to fully cure to provide a cured dual acting epoxy-based film having both moisture vapor barrier properties and primer properties. In the resultant cured dual acting epoxy-based film, the moisture vapor transmission rate was measured at 0.09 perms at 16 mil according to the water method of ASTM E 96 Standard Test Methods for Water Vapor Transmission of Materials. After the deposited dual acting epoxy-based layer of the invention was allowed to cure, a cementitious self-leveling underlayment was poured directly over and onto such vapor barrier and primer cured layer. After drying, no delamination was found between the cementitious self-leveling underlayment and the present moisture vapor barrier and primer epoxy-based film of the invention. The present dual acting epoxy-based films of the invention combine moisture mitigation and primer into a single product, while eliminating the priming step at a job site.

Example 2A: Liquid Epoxy Resin Composition (Part A)

| Composition/Property | Weight %* |
|---|---|
| Liquid epoxy resins | 58.4 wt. % |
| Epoxy functional reactive diluent | 5 wt. % |
| Adhesion promoter | 1.0 wt. % |
| Defoamer | 0.4 wt. % |
| Wetting and dispersing additive | 0.2 wt. % |
| Mica | 35 wt. % |
| TOTAL FORMULATION | 100 wt. % |

*Range weight % based on total weight of resultant liquid epoxy resin composition (Part A)

Example 2B: Liquid Epoxy Curing Agent Composition (Part B)

| Composition/Property | Weight %* |
|---|---|
| Liquid epoxy curing agents | 99.0 wt. % |
| Adhesion promoter | 1.0 wt. % |
| TOTAL FORMULATION | 100 wt. % |

*Range weight % based on total weight of the liquid epoxy curing agent composition (Part B)

In Examples 2A and 2B, the Part A and Part B compositions were mixed at the stoichiometric ratio of 3.4 to 1. The formulated dual acting epoxy-based liquid was applied to a concrete substrate using known techniques to a thickness of about 20 mil. The deposited dual acting epoxy-based liquid was allowed to fully cure to provide a cured dual acting epoxy-based film having both moisture vapor barrier properties and primer properties. In the resultant cured dual acting epoxy-based film, the moisture vapor transmission rate was measured 0.08 perms at 20 mil according to the water method of ASTM E 96 Standard Test Methods for Water Vapor Transmission of Materials. After the deposited dual acting epoxy-based layer of the invention was allowed to cure, a cementitious self-leveling underlayment was poured directly over and onto such vapor barrier and primer cured layer. After drying, no delamination was found between the cementitious self-leveling underlayment and the present moisture vapor barrier and primer epoxy-based film of the invention. The present dual acting epoxy-based films of the invention combine moisture mitigation and primer into a single product, while eliminating the priming step at a job site.

Example 3A: Liquid Epoxy Resin Composition (Part A)

| Composition/Property | Ingredient | Weight %* |
|---|---|---|
| Liquid epoxy resins | an aliphatic glycidyl ether reactive diluent, modified liquid epoxy resin | 94.20 wt. % |
| Epoxy functional reactive diluent | epoxidized Butanediol | 5.00 wt. % |
| Defoamer | naphtha (petroleum) heavy alkylate defoamer | 0.20 wt. % |
| Wetting and dispersing additive | silicone-modified polyacrylate | 0.10 wt. % |
| Adhesion promoter | γ-Glycidoxypropyl-trimethoxy silane coupling agent | 0.50 wt. % |
| TOTAL FORMULATION | TOTAL FORMULATION | 100 wt. % |

*Range weight % based on total weight of resultant liquid epoxy resin composition (Part A)

Example 3B: Liquid Epoxy Curing Agent Composition (Part B)

| Composition/Property | Ingredient | Weight %* |
|---|---|---|
| Epoxy curing agent 1 | solvent free modified aliphatic amine | 40.00 wt. % |
| Epoxy curing agent 2 | a modified polyamine curing agent | 59.00 wt. % |
| Adhesion promoter | diaminofunctional silane | 1.00 wt. % |
| TOTAL FORMULATION | 100% | 100 wt. % |

*Range weight % based on total weight of the liquid epoxy curing agent composition (Part B)

In Examples 3A and 3B, the Part A and Part B compositions were mixed at the stoichiometric ratio of 1.5 to 1. In accordance with Examples 3A and 3B, the Part A and Part B compositions were stored at room temperature 65-85° F. (18-30° C.) for 24 hours to ensure ease of mixing prior to use thereof. The two components were then mixed at a weight of 1.5 part liquid epoxy resin composition (Part A) to 1 part liquid epoxy curing agent composition (Part B) using a slow speed drill (<300 RPM) with a jiffy blade for about 2 minutes or until the mixture was fully uniform and all ribbons of contrasting shade/color are completely eliminated. The formulated dual acting epoxy-based liquid was applied to a concrete substrate to a thickness of 16 mil using known techniques and cured to provide a cured dual acting epoxy-based film of the invention having both moisture vapor barrier properties and primer properties. It was found that the resultant dual acting liquid epoxy-based formulation of Examples 3A and 3B had an open time of about 30 minutes, a pot life of about 15 minutes, and once deposited, a time to foot traffic of about 3 hours.

After the deposited dual acting epoxy-based layer of Examples 3A and 3B was allowed to cure, testing was performed on the film/layer of the invention. Physical properties test results at room temperature are shown in the below table as follows:

| Test | Test method | Results |
|---|---|---|
| Vapor Permeance at 16 mil thickness | ASTM E96 | 0.094 grains/h/ft$^2$/in Hg (5.4 ng/sec · m$^2$ · Pa) |
| Tensile strength | ASTM C1583 | 363 psi (2.5 MPa) |
| Pull off Adhesion Strength | ASTM D7234 | 660 psi (4.6 MPa) Concrete substrate failure |

In the resultant cured dual acting epoxy-based film, the moisture vapor transmission rate was measured 0.08 perms at 20 mil according to the water method of ASTM E 96 Standard Test Methods for Water Vapor Transmission of Materials. After the deposited dual acting epoxy-based layer of the invention was allowed to cure, a cementitious self-leveling underlayment was poured directly over and onto such vapor barrier and primer cured layer. After drying, no delamination was found between the cementitious self-leveling underlayment and the present moisture vapor barrier and primer epoxy-based film of the invention. The present dual acting epoxy-based films of the invention combine moisture mitigation and primer into a single product, while eliminating the priming step at a job site.

Referring to the comparative test results depicted in FIG. 1 and described below, prior art epoxy-based moisture mitigation layers, with and without primers, were tested and compared against the resultant dual acting liquid epoxy-based formulation of Examples 3A and 3B. The prior art epoxy-based Composition 1 (without primer) and Composition 2 (with primer) products were each tested as moisture vapor barriers meeting ASTM F3010 according to the test method of ASTM E96 of moisture mitigation system are used on concrete substrates. A cement based self-leveling underlayment was deposited over the resultant film of Examples 3A and 3B and the prior art Composition 1 and Composition 2. In Composition 2 the primer was applied using sand broadcast techniques to increase the adhesion between the cement based self-leveling underlayment and the epoxy moisture vapor barrier of Composition 2.

The three (3) different compositions were tested for adhesion failure between each deposited epoxy moisture vapor barrier and the overlying cement based self-leveling layer. As shown in the below table, in Composition 1 (without primer) the adhesion strength was low, resulting in quick/easy adhesion failure between Composition 1 and the self-leveling layer. Composition 2 (with primer) had better results than Composition 1, however, it has the added detrimental steps of applying and cleaning a primer layer (e.g., via sand broadcast techniques). The resultant dual acting epoxy-based film of Examples 3A and 3B of the invention showed superior results over Compositions 1 and 2 by having stronger tensile strength, with the added benefit of avoiding or eliminating the need for a primer step. The physical tensile strength test results performed at room temperature are shown in the following table:

| Test | Test method | Results |
|---|---|---|
| Tensile strength without primer | ASTM C1583 | 102 psi (0.70 MPa) |
| Tensile strength with primer | ASTM C1583 | 290 psi (2.0 MPa) |
| Tensile strength | ASTM C1583 | 363 psi (2.5 MPa) |

Thus, the present invention provides dual acting epoxy-based formulations that are single-coat, 100% solids, liquid applied two-component part epoxy coatings that consolidate the application of a moisture barrier and primer from two-step application process into a one-step application process. It is suitable for use as an epoxy primer for concrete prior to installing self-leveling underlayment products. It is also suitable for use with various overlying layers including, but not limited to, vinyl, rubber, VCT, carpet, wood, ceramic tile, stone and other moisture sensitive floor coverings and flooring adhesives. Advantageously, the dual acting epoxy-based formulations may also be deposited in a single step, and as such, requires no sand broadcast or additional primers, thereby lowering costs.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

The invention claimed is:

1. A two-component epoxy-based liquid formulation comprising:
    a liquid epoxy resin composition comprising at least one liquid epoxy resin material comprising a mixture of: oxirane, 2,2'-[(1-methylethylidene)bis(4,1-phenyleneoxymethylene)]bis-, homopolymer, a formaldehyde polymer having (chloromethyl)oxirane and phenol, and an alkyl (C12-14) glycidyl ether the liquid epoxy resin material being present in an amount from 80-99.9 wt. %, a reactive diluent comprising oxirane 2,2'-[1,4-butanediylbis(oxymethylene)]bis structure, a silicone acrylate copolymer as a wetting and dispersing additive present in an amount from 0.1-1.0 wt. %, and a defoamer comprising naphtha (petroleum) heavy alkylate, whereby said weight percentages are based on a total weight of the liquid epoxy resin composition; and
    a liquid epoxy curing agent composition comprising a liquid epoxy curing agent mixture comprising two or more liquid epoxy curing agents selected from the group consisting of liquid polyamines, liquid polyamine adduct curing agents, and liquid aliphatic amines, the liquid epoxy curing agent mixture is present in an amount from 80-100 wt. % based on a total weight of the liquid epoxy curing agent composition, the liquid epoxy curing agent mixture including a first epoxy curing agent comprising a mixture of: 4-tert-butylphenol and methyl alcohol, and a second epoxy curing agent comprising a mixture of: phenol 4-nonyl-branched; 1,3-benzenedimethanamine; benzyl alcohol; and phenol, and including an adhesion promoter comprising a diaminofunctional silane,
    wherein the liquid epoxy resin composition and the liquid epoxy curing agent composition are mixed together in a stoichiometric ratio of 1.5:1 to 3.4:1 to provide a dual functioning single coating epoxy-based formulation that, when applied to a substrate as the single coating and cured, simultaneously acts as both a moisture vapor barrier and a primer.

2. The formulation of claim 1 wherein the liquid epoxy resin composition further includes additives selected from the group consisting of adhesion promoters, defoamers, pigments and fillers.

3. The formulation of claim 1 wherein the liquid epoxy resin composition further comprises;
    an adhesion promoter comprising a γ-Glycidoxypropyl-trimethoxy silane coupling agent;
    pigment; and
    one or more fillers.

4. The formulation of claim 3 wherein the liquid epoxy resin composition comprises;
    the at least one liquid epoxy resin material present in the amount ranging from 80-99.9 wt. %,
    the epoxy functional reactive diluent present in an amount ranging from greater than 0-20 wt. %,
    the adhesion promoter present in an amount ranging from greater than 0-3 wt. %,
    the defoamer present in an amount ranging from greater than 0-1 wt. %,
    the wetting and dispersing additive present in an amount ranging from greater than 0-1 wt. %,
    the pigment present in an amount ranging from greater than 0-2 wt. %, the filler present in an amount ranging from greater than 0-20 wt. %,
    wherein the wt. % is based on a total weight of the liquid epoxy resin composition.

5. The formulation of claim 1 wherein the liquid epoxy curing agent composition comprises;
    the mixture of two or more liquid epoxy curing agents present in the amount ranging from 80-100 wt. %,
    a catalytic curing agent present in an amount ranging from 0-5 wt. %,
    an adhesion promoter present in an amount ranging from 0-3 wt. %,
    a defoamer present in an amount ranging from 0-1 wt. %,
    a wetting and dispersing additive present in an amount ranging from 0-1 wt. %, a pigment present in an amount ranging from 0-2 wt. %,
    a filler present in an amount ranging from 0-20 wt. %,
    wherein the wt. % is based on a total weight of the liquid epoxy curing agent composition.

6. A two-component system for forming a dual functioning epoxy-based formulation comprising prior to mixing:
    a liquid epoxy resin composition comprising,
    a reactive diluent modified liquid epoxy resin containing a reactive oxirane structure or epoxide group present in the liquid epoxy resin composition in an amount from 85-94.3 wt. %, the reactive diluent modified liquid epoxy resin comprising a base liquid epoxy resin mixed with a reactive diluent to render said reactive diluent modified liquid epoxy resin component,
    an epoxy functional reactive diluent present in the liquid epoxy resin composition in an amount from 5-15 wt. % to reduce viscosity and surface tension,
    an adhesion promoter present in the liquid epoxy resin composition in an amount from 0.4-1.0 wt. %,
    a defoamer present in the liquid epoxy resin composition in an amount from 0.2-1.0 wt. %
    a wetting and dispersing additive present in the liquid epoxy resin composition in an amount from 0.1-0.5 wt. %,
    whereby all weight percentages are based on a total weight of the liquid epoxy resin composition; and
    a liquid epoxy curing agent composition comprising,
    a liquid epoxy curing agent material comprising a mixture of a first epoxy curing agent comprising a mixture of 4-tert-butylphenol and methyl alcohol mixed with a second epoxy curing agent comprising a mixture of phenol 4-nonyl-branched; 1,3-benzenedimethanamine; benzyl alcohol; and phenol, the liquid epoxy curing agent material present in the liquid epoxy curing agent composition in an amount from 99-99.5 wt. %, an adhesion promoter comprising a diaminofunctional silane present in the liquid epoxy curing agent composition in an amount from 0.5-1.0 wt. %, whereby all weight percentages are based on a total weight of the liquid epoxy curing agent composition;

wherein when the liquid epoxy resin composition and the liquid epoxy curing agent composition are mixed together said dual functioning epoxy-based formulation is formed that, when applied to a substrate and cured, simultaneously acts as both a moisture vapor barrier and a primer.

7. The formulation of claim 6 wherein the reactive diluent modified liquid epoxy resin comprises a bisphenol based liquid epoxy resins selected from the group consisting of a diglycidyl ether of bisphenol A, a bisphenol F, or a mixture of bisphenol A and bisphenol F.

8. The formulation of claim 6 wherein the reactive diluent modified liquid epoxy resin comprises an aliphatic glycidyl ether reactive diluent modified liquid epoxy resin.

9. The formulation of claim 6 wherein the reactive oxirane structure has a structure comprising 10. The formulation of claim 6 wherein the epoxy functional reactive diluent is selected from the group consisting of an aromatic glycidyl ether, aliphatic glycidyl ether, glycidyl amine, or glycidyl ether.

11. The formulation of claim 10 wherein the epoxy functional reactive diluent is a diglycidyl ether comprising 1,4 butanediol diglycidyl ether aliphatic difunctional modifier that is an epoxy reactive diluent.

12. A two-component dual functioning epoxy-based liquid formulation comprising:

a liquid epoxy resin composition comprising at least one liquid epoxy resin material comprising a mixture of: oxirane, 2,2'-[(1-methylethylidene)bis(4,1-phenyleneoxymethylene)]bis-, homopolymer, a formaldehyde polymer having (chloromethyl)oxirane and phenol, and an alkyl (C12-14) glycidyl ether present in an amount from 80-99.9 wt. %, whereby said weight percentages are based on a total weight of the liquid epoxy resin composition; and a liquid epoxy curing agent composition comprising a liquid epoxy curing agent mixture including a first epoxy curing agent comprising at least 4-tert-butylphenol and, a second epoxy curing agent comprising at least phenol 4-nonyl-branched and 1,3-benzenedimethanamine, the liquid epoxy curing agent mixture is present in an amount from 80-100 wt. % based on a total weight of the liquid epoxy curing agent composition, wherein the liquid epoxy resin composition and the liquid epoxy curing agent composition are mixed together in a stoichiometric ratio of 1.5:1 to 3.4:1 to provide a dual functioning single coating epoxy-based formulation that, when applied to a substrate as the single coating and cured, simultaneously acts as both a moisture vapor barrier and a primer.

13. The formulation of claim 12 wherein the liquid epoxy resin composition further comprises a reactive diluent comprising oxirane, 2,2'-[1,4-butanediylbis(oxymethylene)]bis.

14. The formulation of claim 13 wherein the liquid epoxy resin composition further comprises a defoamer comprising naphtha (petroleum) heavy alkylate.

15. The formulation of claim 12 wherein the liquid epoxy curing agent composition further comprises an adhesion promoter comprising a diaminofunctional silane.

16. The formulation of claim 15 wherein the second epoxy curing agent further comprising benzyl alcohol and phenol.

17. The formulation of claim 12 wherein the first epoxy curing agent further comprise methyl alcohol.

* * * * *